(No Model.)
Z. W. SMITH.
CORN SHOCKING MACHINE.
No. 398,463. Patented Feb. 26, 1889.
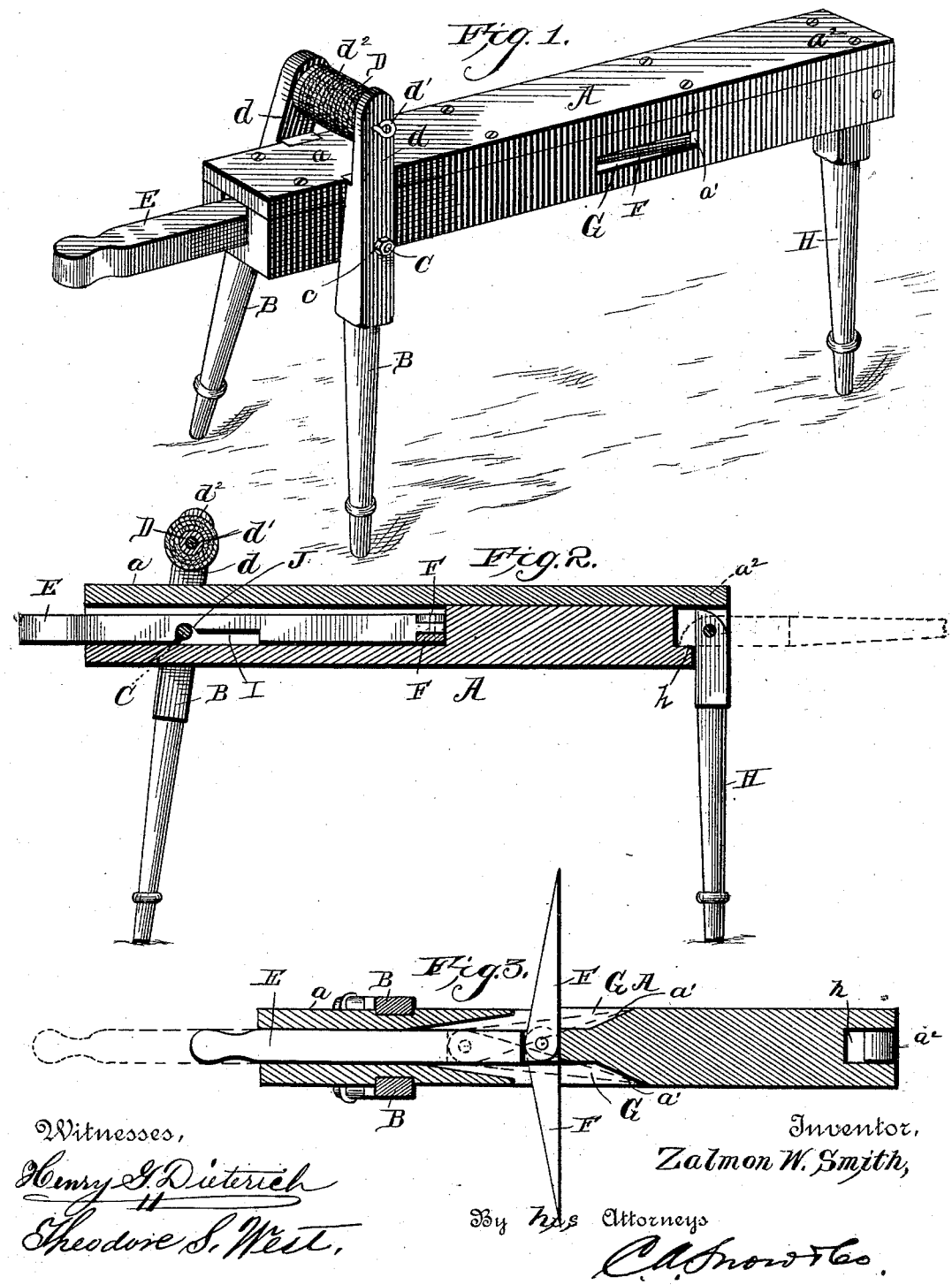
Witnesses,
Henry G. Dieterich
Theodore S. West
Inventor,
Zalmon W. Smith,
By his Attorneys
C. A. Snow & Co.

UNITED STATES PATENT OFFICE.

ZALMON W. SMITH, OF ADDISON, NEW YORK.

CORN-SHOCKING MACHINE.

SPECIFICATION forming part of Letters Patent No. 398,463, dated February 26, 1889.

Application filed August 13, 1888. Serial No. 282,611. (No model.)

*To all whom it may concern:*

Be it known that I, ZALMON W. SMITH, a citizen of the United States, residing at Addison, in the county of Steuben and State of New York, have invented a new and useful Improvement in Corn-Shocking Machines, of which the following is a specification.

The invention relates to improvements in corn-shocking machines; and it consists in the construction and novel combination of parts hereinafter described, illustrated in the accompanying drawings, and pointed out in the appended claim.

Figure 1 of the drawings represents a perspective view of a machine embodying the invention. Fig. 2 represents a central vertical longitudinal section thereof with the handle shoved in. Fig. 3 is a horizontal section of a part of the body of the machine, showing the arms and the slots in the sides of the body.

Referring to the drawings, A designates the long rectangular body of the machine, and B B the legs secured thereto near one end, $a$. The said legs diverge downwardly, and are secured to the body by the long transverse bolt C and the nut $c$, engaging the threaded end of said bolt.

Between the upper extensions, $d$ $d$, of the legs is the transverse bar $d'$, which passes through the axial opening of and supports a spool, D, adapted to carry the binding-cord $d^2$.

E is a handle that can be moved inward and outward in the hollow interior of the body, and F F are similar arms pivoted at their butts upon the inner end of the handle, having outwardly-converging edges and pointed ends, and passing out of the inclined slots G G in the sides of the body. The handle passes out of the open end of the body that adjoins the legs B, and the slots G G are inclined toward the opposite end, $a'$, of the body, so that, when the handle is pushed in, the arms F are extended outward by the opposing edge of the slot, and when the handle is pulled out the arms are drawn in within the body and lie entirely in the slots G, which are formed to receive them.

H is a third leg, having its upper end pivoted between the sides of the body at the end $a^2$, the bottom being cut away to form a notch and a shoulder, $h$, against which the leg H bears when turned vertically downward, and the leg is prevented by said shoulder from turning inward past the perpendicular. The said leg has its upper end rounded, so as to turn easily in its seat.

The handle has a transverse notch, I, on its lower side, to prevent the handle from being withdrawn. In the top of the notch is the recess J, which, when the handle is pushed in and the arms F extended, catches upon the shank of the bolt C and prevents the handle from being drawn out or moved any distance by accident.

Before pulling the handle outward it must be lifted to free the bolt from the recess J in the top of the notch.

In operation the machine is placed in position where it is desired to form a shock, with the corn standing against the sides of the body, the leg H being turned down, so that the body is supported upon three legs. The handle is then shoved in and the arms extended, forcing the standing corn toward the operator, and the shock tied with a part of the cord $d^2$. The shock being completed, the handle is lifted and pulled outwardly, the arms thereby retracted within the body, and after said retraction the leg H is bent and the body and leg slip out of the shock. The machine is then removed to a second position and operated as before.

Having described my invention, I claim—

The improved corn-shocking machine comprising the hollow body having the inclined slots G in its sides, the legs B B, secured to the body at one end, the spool mounted between the upper ends of said legs, the bolt C, securing the legs to the body and passing transversely through the body, the handle sliding in the body and having a notch, I, in its lower side fitting over the bolt C, the said notch having a recess, J, in its top adapted to engage said bolt when the handle is pushed inward, and the arms F, fitting in the slots G, and having their inner ends pivoted to the end of the handle, as specified.

In testimony that I claim the foregoing as my own I have hereto affixed my signature in presence of two witnesses.

ZALMON W. SMITH.

Witnesses:
 G. H. BREWSTER,
 C. A. BREWSTER.